9020X
H. B. Fernald,
Motor.
Patented Aug. 17, 1835.
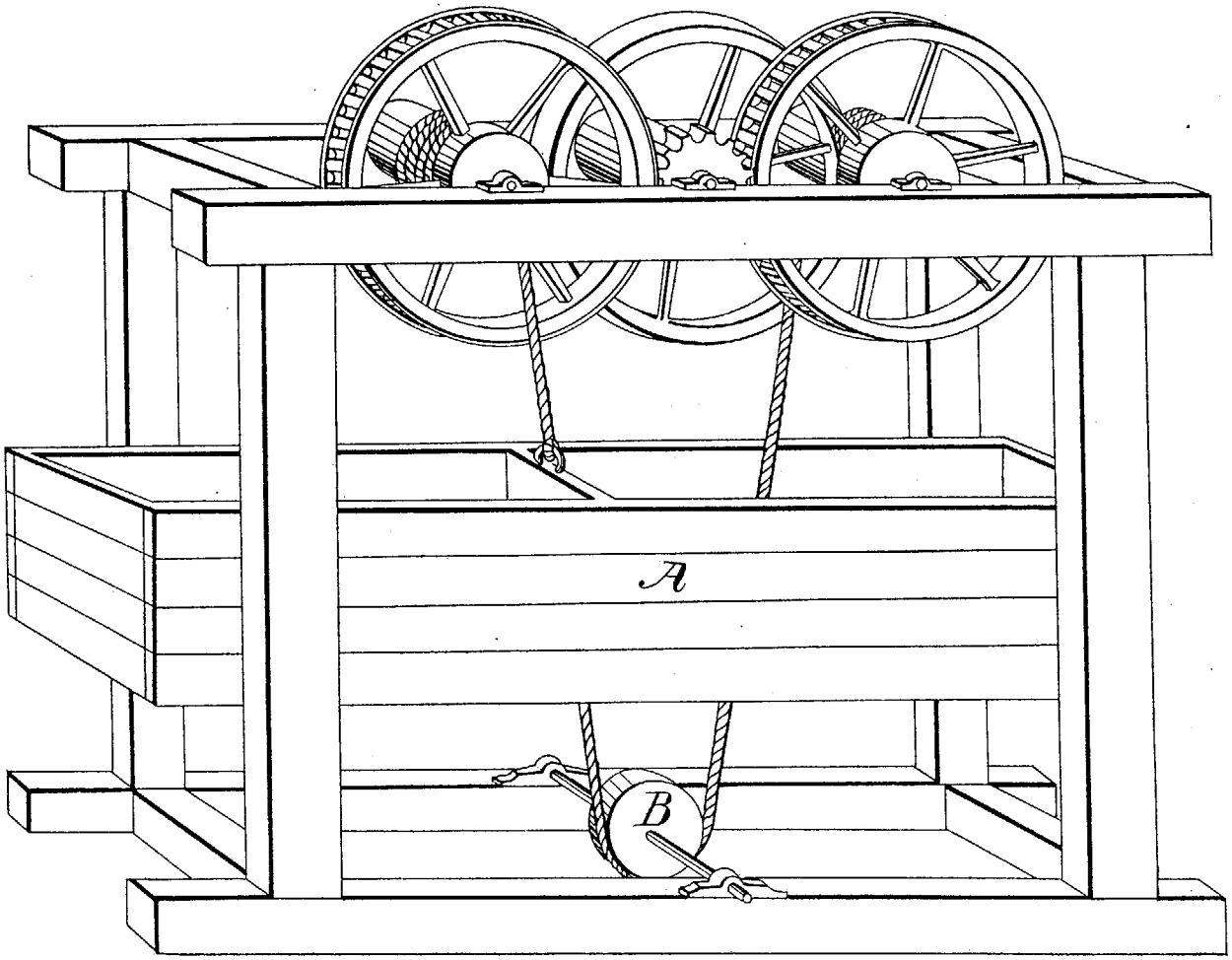
AM. PHOTO-LITHO. CO. N.Y. (OSBORNE'S PROCESS)

9020X Aug 17, 1835 237

Henry B. Fernald of Portland, county of Cumberland and State of Maine

Letters Patent

The schedule referred to in these Letters Patent and making part of the same; containing a description in the words of the said Henry B. Fernald himself of his improvement in applying the rising and falling of the tide and other waters to the propelling of machinery To all persons to whom these Presents shall come:

Be it known, that I Henry B. Fernald of Portland in the county of Cumberland and state of Maine, have invented a new and usefull discovery in applying the rising and falling of the tide and other waters to the propelling of machinery called: A new and useful discovery which consists in applying the rising and falling of the tide and other waters to the propelling of machinery - In the rising of the tide or water the buoyancy of the water is taken advantage of by means of a buoy of sufficient strength and dimensions, connected by a rope or chain passing from the buoy under a pulley at the bottom of the water with a wheel which moves the machinery - In the falling of the tide or water, the weight of the buoy filled with water by means of a stopcock or otherwise operates as a propelling power, being so connected by another rope or chain to another wheel as to operate alternately with the wheel above mentioned - The invention is such that any water, which may be made to rise and fall by artificial means may be applied as above described. What I specifically claim as my invention or discovery is the principle of applying the rising and falling of the tide and other water to the propelling machinery - In testimony, that the above is a true specification of my said discovery or invention as above described I have hereto set my hand and seal the 10th day of June in the year of our Lord One thousand Eight Hundred and thirty five Witnesses
W. P. Smith - I. Adams Henry B. Fernald Patented 17 August 1835
Drawing made Drawing

[377 ...] Ex'd 1191